April 18, 1967     W. BRUMMUND     3,315,048
CONTROL SYSTEM FOR MOLDING MACHINES AND THE LIKE
Filed Jan. 27, 1964
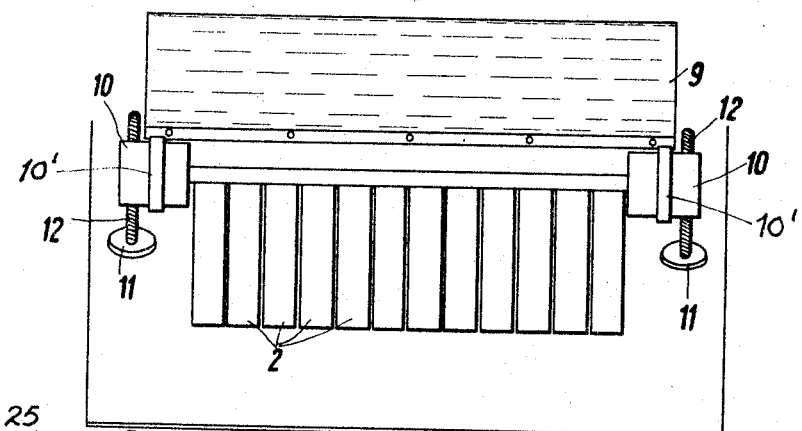
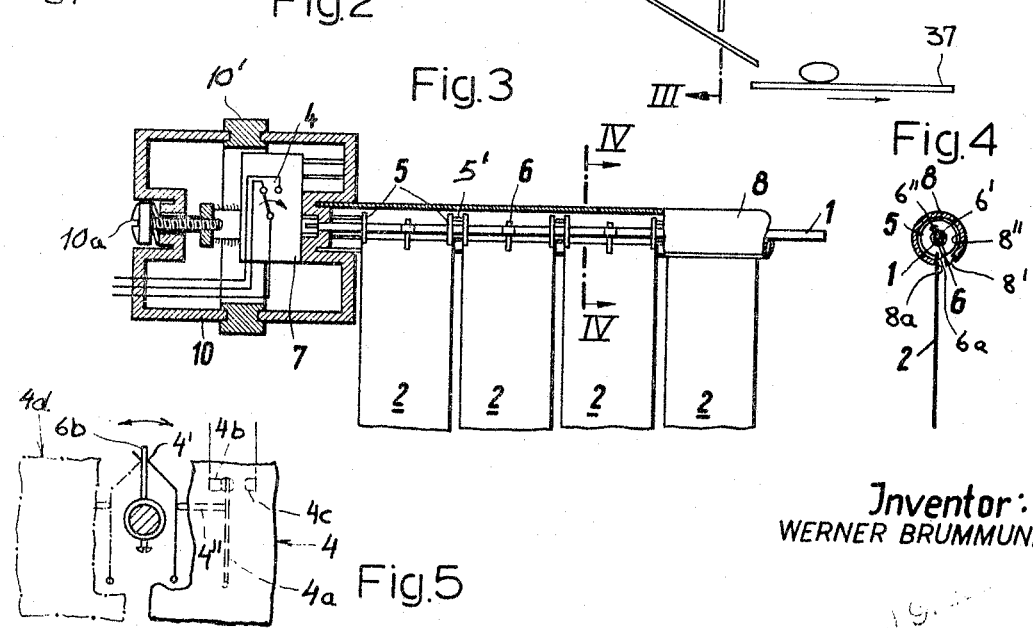
Inventor:
WERNER BRUMMUND

United States Patent Office 3,315,048
Patented Apr. 18, 1967

3,315,048
CONTROL SYSTEM FOR MOLDING MACHINES AND THE LIKE
Werner Brummund, Uffeln uber Vlotho, Germany, assignor to Friedrich Stüble, Vlotho (Weser), Germany
Filed Jan. 27, 1964, Ser. No. 340,142
Claims priority, application Germany, Jan. 29, 1963, St 20,235
10 Claims. (Cl. 200—61.41)

My present invention relates to molding machines and like apparatus having an electric circuit adapted to be triggered upon the output of workpieces from the apparatus and, more particularly, to a system for the automatic control of such apparatus and responsive to the output of workpieces therefrom.

The automatic control of molding machines, especially injection-molding devices and pressure-molding apparatus, has been carried out heretofore with the aid of electric control circuits adapted to be triggered upon the output of workpieces from the apparatus for initiating a programming sequence effecting the production of further workpieces. Such a machine is disclosed in U.S. Patent No. 2,675,583. The present invention also pertains to apparatus of the character described wherein the electric circuit includes mechanical sensing means responsive to the output of workpieces from the apparatus for initiating further processing of these workpieces. Basically, such control systems include switch means of the character referred to above and a mechanism for actuating these switch means upon discharge of the workpiece from the apparatus.

In one known system of this type, the workpieces are deposited upon a balance which, under the weight of the workpiece, swings about its fulcrum and actuates the contact. The disadvantage of this construction is that its response is relatively slow especially when the balance beam and the workpiece receptacle have a relatively large mass; in this case, the period of the balance beam is relatively large and prevents an immediate triggering of the control circuit of the apparatus. This disadvantage increases in importance when the workpieces are light when compared with the mass of the receptacle and/or the balance beam. Essentially the same disadvantage, i.e. slow response, characterizes control systems wherein the sensing means includes a flap extending substantially the full width of the discharge chute and adapted to be deflected by the workpieces. In this case, the relatively large mass of the flap imparts considerable inertia to the sensing device and effectively prevents instantaneous operation of the control circuit.

It is, therefore, the principal object of the present invention to provide a system for the automatic control of an apparatus having an electric circuit adapted to be triggered upon the output of workpieces from the apparatus whereby the aforementioned disadvantages can be avoided and a substantially instantaneous actuation of the control circuit, upon discharge of workpieces from the apparatus, can be ensured.

A further object of this invention is to provide a control system of the character described wherein the effect of inertia in delaying the response of the system can be negatived or limited.

Still another object of this invention is to provide a control system responsive to the output of workpieces from a molding apparatus, e.g. an injection-molding or a compression-molding machine, which affords automatic control of the apparatus and is of relatively low cost, simple construction, and possesses relatively little tendency toward breakdown.

The foregoing objects and others which will become apparent hereinafter, are attained in accordance with the present invention by providing a system for the control of an apparatus, such as a molding machine, having an electric circuit (e.g. for actuating piston-and-cylinder means or the like) adapted to be triggered upon the output of workpieces from the apparatus, say, as a result of the opening of a mold, the system comprising guide means at the apparatus forming a path for the workpieces discharged therefrom and sensing means along this guide path and responsive to the passage of a workpiece therealong while having a relatively low inertia and high response time to energize switch means included in the electric circuit for operating same. According to an important feature of the present invention, the sensing means comprises a housing, which may be constituted by an elongated sleeve extending above the path transversely thereof and is journaled for rotation relative to the housing about a longitudinal axis, preferably, within an elongated cavity formed by the housing. A plurality of longitudinally offset sensing leaves, each of which may be composed of a synthetic resin and may be relatively thin so as to have a low moment of inertia, depends from this element into the path of the workpieces and are spaced along the element across the guide path so that only a relatively small number of leaves is deflected by each workpiece traversing the path. It will immediately be apparent that this construction replaces the single flap of prior-art devices by a plurality of independently displaceable leaves each of which has a fraction of the inertia of the single flap, although the thicknesses of the two may be the same. Each of the leaves is independently rotatable upon the element and abutment means is provided on the element and on the leaves for entraining the element along with one of the leaves upon its deflection in one rotational sense by a workpiece traversing the path, the abutment means permitting the leaves to swing freely relative to said element in the opposite rotational sense. Switch means, operatively connected with the element and included in the electric circuit, is also provided for actuation by the element to control the apparatus upon displacement of one of the leaves by a workpiece discharged from the apparatus. Since only one, or more generally speaking, only a relatively few leaves are deflected by each passage of a workpiece, the deflected leaves entrain the elongated element, which likewise is designed to have a relatively low moment of inertia, to actuate the switch while the remaining leaves are unaffected and do not contribute to the moment of inertia involved in the rotation of the element.

According to a more specific feature of the present invention, each of the sensing leaves is a foil journaled in the elongated cavity of the housing via respective bearing disks which can rotatably engage the wall of this cavity and prevent bending. The elongated element can be provided with restoring means, advantageously constituted solely by a spring forming part of a sensitive switch actuatable by the elongated element and adapted to return this element to a normal position upon its displacement by one of the leaves into an off-normal position. While additional spring means can be provided as desired, it has been found that sensitive switches or so-called microswitches, are particularly suitable for the practice of the present invention inasmuch as these switches usually are provided with spring means to displace the contact between extreme positions and have a restoring force equal to a gram or less, this restoring force being sufficient to return the elongated element into its normal position especially when the element is a relatively thin rod; the bearing disks prevent distortion of the rod during use of the sensing means. The bearing disks thus provide spaced supports along the thin rod to prevent its deflection transverse to its major dimension by the leaf or by some other means. I have found that particularly good results are obtained when the housing includes an elongated sleeve provided with a throughgoing slot along the lowermost line generatrix of the sleeve and communicating with the cavity thereof through which the longitudinally offset sensing sleeves depend into the path of the workpieces. The sleeve has been found to prevent distortion of the sensing leaves and the elongated element upon impulsive contact of the workpieces with the leaves.

In order to prevent bypassing of the sensing element by the workpieces, the sensing means is provided with baffle means extending generally upwardly from the sleeve and adapted to guide the workpieces onto the guide means forming the transport path for the workpieces. The baffle means can be angularly adjustable upon the housing and is preferably inclined to the guide means which can be constituted by one or more plates forming a converging path for the workpieces in the direction of displacement thereof. Moreover, according to a further feature of the present invention, the entire sensing means is adjustably mounted along the guide means by a support mechanism including magnetic means engageable with the guide plate. The mechanism can also include gooseneck tubes or like means bridging the housing and the magnetic means for adjustably positioning the sensing means above the path.

This construction has been found to permit absolute repetition of operation without disruption when the switch means is provided on one or more sides of the elongated element. Complicated electrical switch mechanisms can be avoided while the entire sensing system is significantly simplified and improved. When the abutment means on the elongated element and the leaves is constructed so as to be angularly adjustable, the sensitivity of the system can be regulated. Moreover, with a switch mechanism of the character described, the electrical circuit can be provided with controls so that an improper rake-like operation of the device, an open circuiting of the supply means for the switch means, or a short circuit can actuate relays or the like for disconnecting the switch means from the circuit and terminate automatic operation of the device. In general, it may be stated that the switch means of the present invention can perform a function identical with the weight-responsive switch of the aforementioned U.S. patent.

The above and other objects, features and advantages of the present invention will become more readily apparent from the following description, reference being made to the accompanying drawing in which:

FIG. 1 is a partial elevational view of a system, in accordance with the present invention, for use with molding machines and the like;

FIG. 2 is a side-elevational view of the system of FIG. 1;

FIG. 3 is an enlarged axial cross-sectional view taken along the line III—III of FIG. 2;

FIG. 4 is a transverse cross-sectional view taken along the line IV—IV of FIG. 3; and FIG. 5 is a transverse cross-sectional view showing the connection between the elongated element of the sensing means and the switch means according to the present invention.

In the drawing, I show a control system suitable for use in injection molding and compression molding devices, e.g. for the production of synthetic-resin or light-metal articles, such an apparatus being shown diagrammatically in FIG. 2. In this diagrammatic apparatus, a pair of mold halves 20, 21 are displaceable toward and away from one another by respective pistons 23, 24 of hydraulic or pneumatic cylinders 25, 26. It should be noted that, while fluid-responsive means is employed for this purpose in many cases, other programming and control systems can also be used. The mold halves 20, 21 form a mold cavity 22 from which finished articles 35 are discharged by ejection pins 27 and 28 when the mold is opened. The articles 35 constitute the workpieces of the present invention and are guided downwardly by a plate 36 constituting guide means forming a transport path for these workpieces, to a conveyor 37 by means of which the workpieces are carried away from the apparatus. The cylinders 25 and 26 are energized via a valve 29 by a pair of conduct networks 30, 31, the valve 29 having two positions and being controlled by the solenoid coils 32 connected in circuit with battery 33 and the switch 4, which is operable by the sensing means as will be described in greater detail hereinafter. Valve 29 in one position passes fluid through the cylinders 25 and 26 to advance the pistons 23, 24 toward one another and, in the second position, draws the pistons 23 and 24 away from one another. In addition, the switch 4 can be provided in the electric circuit in such manner as to simultaneously actuate a programming device 34 which regulates the further steps of the production sequence of the apparatus. Such steps include, for example, the injection of a synthetic-resin or metallic material into the mold cavity, the densification of a plastic material, the heating or cooling of a mold.

The sensing system comprises a thin elongated element or rod 1 which extends transversely of the guide pair formed by plate 11 and is journaled in a housing 10 which includes a sleeve or shell 8 of cylindrical configuration having an elongated opening in the form of a slot 8' along a lower portion of the sleeve; this slot extends along a generatrix of the cylindrical shell. A rake-like array of longitudinally spaced leaves 2 is mounted upon the elongated element 1 in a manner best illustrated in FIG. 4. The leaves 2 are each provided with a pair of bearing disks 5 in close proximity with the wall of the cavity 8'' of sleeve 8 to prevent bending of the leaves 2 or the rod 1 upon contact of a workpiece 35 with one or more leaves. The bearing disks 5 are rotatable upon the rod 1 and are spaced from the disks of adjacent leaves by washers 5'. Each of the leaves 2 is associated with a respective abutment means 6 whereby the leaves 2 entrain the rod 1 upon their deflection in the counterclockwise sense (FIGS. 2 and 4) by a workpiece 35 traversing the plate 36. The abutment means 6 includes a ring 6' rotatable upon the rod 1 and adapted to be locked in place by a setscrew 6'' so that the angular distance between the pin 6a of each ring and the respective leave 2 can be adjusted, thereby regulating the response of the system and its sensitivity. The leaves 2, which are composed of a lightweight synthetic resin, depend from the rod 1 to the slot 8' into the path of the workpiece 35 traversing the plate 36. The entire housing 10 is rotatable relative to a ring 10' to permit the angle between the leaves 2 and the plate 36 to be adjusted, the leaves resting against the wall 8a of slot 8'.

A pair of housings 10 are located at opposite ends of the rod 1 and are provided with respective locking screws 10a by means of which the housings can be secured to respective rings 10' in any desired relative angular position. A pair of gooseneck tubes 12 are connected to the rings 10 respectively so that the height of the leaves 2 above the plate 36 can be adjusted. At their lower extremities, the gooseneck tubes 12 are provided with mounting magnets 11 adapted to adhere to the plate 36 at any desirable location, thereby permitting adjustment of the location of the sensing means along this magnetical permeable plate. As will be evident from FIG. 5, the switch means 4, diagrammatically illustrated in FIG. 3, can be constituted by a microswitch whose actuating element 4' bears upon a pin 4'' to displace the leaf-spring contact 4a from engagement with a first fixed contact 4b into engagement with a second fixed contact 4c. For this purpose the rod 1 is provided with a further abutment 6b, angularly adjustable relatively to the rod and adapted to bear upon the microswitch when the rod is rotated in a clockwise sense as viewed in FIG. 5. Should the electrical circuit require, a second microswitch 4d is provided on the opposite side of the rod 1 for engagement when the latter is rotated in the counterclockwise sense by the spring contact 4a of switch 4. While any suitable restoring means can be provided it may be noted that excellent results are obtained when the restoring spring is the contact spring of the microswitch and is constituted solely thereby.

In operation, the opening of mold halves 20 and 21 results in an ejection of workpiece 35 by pins 27 and 28, the workpiece falling on the guide plate 36 and traversing the latter in the direction of the conveyor 37, a baffle plate 9 being provided on the rings 10' and being angularly adjustable relatively to the housing for preventing the jumping of workpieces 35 over the sensing system. As the workpiece 35 travels along plate 36, it deflects one of the leaves 2 in a counterclockwise sense (FIG. 2) so that this displaced leaf engages its abutment 6 and rotates the rod 1 to actuate switch 4. The remaining leaves are undisturbed since they are freely swingable on the rod. When switch 4 is energized in this manner, the valve 29 is reversed to initiate the closing of mold halves 20 and 21 for commencing a new program or sequence of steps.

The invention described and illustrated is believed to admit of many modifications within the ability of persons skilled in the art, all such modifications being considered within the spirit and scope of the appended claims.

What is claimed is:

1. In a system for the automatic control of an apparatus producing a series of workpieces, the combination with an electric circuit adapted to be triggered upon the output of workpieces from said apparatus for controlling said apparatus, of:
 guide means at said apparatus forming a path for the workpieces discharged therefrom;
 sensing means along said guide path and responsive to the passage of a workpiece therealong, said sensing means including an elongated element extending above said path transversely thereof and journaled for rotation about a longitudinal axis of said element, a plurality of longitudinally offset sensing leaves depending from said element into said path and journaled on said element for independent rotation thereon, and abutment means on said element and on said leaves for rotatable entraining said element along with one of said leaves deflected in one rotational sense by a workpiece traversing said path while permitting said leaves to swing freely relatively to said element in the opposite rotational sense; and
 switch means operatively connected with and actuatable by said element upon rotation of said element by one of said leaves and connected in said circuit for operating same to control said apparatus upon displacement of said one of said leaves by a workpiece discharged from said apparatus.

2. In a system for the automatic control of an apparatus producing a series of workpieces, the combination with an electric circuit adapted to be triggered upon the output of workpieces from said apparatus for controlling said apparatus, of:
 guide means at said apparatus forming a path for the workpieces discharged therefrom;
 sensing means along said guide path and responsive to the passage of a workpiece therealong, said sensing means including a housing formed with an elongated cavity comprising an elongated sleeve extending above said path transversely thereof, a shaft in the cavity of said sleeve journaled for rotation on said housing about a longitudinal axis of said shaft, said sleeve having a longitudinally extending slot communicating with said cavity, a plurality of longitudinally offset sensing leaves swingably depending from said shaft through said slot into said path and journaled in said housing for independent rotation thereon, each of said leaves having a respective bearing disk extending transversely to said axis and rotatably mounting said leaves in said cavity, and abutment means on said shaft and on said leaves for rotatably entraining said shaft along with one of said leaves deflected in one rotation sense by a workpiece traversing said path while permitting said leaves to swing freely relatively to said shaft in the opposite rotational sense; and
 switch means operatively having a swingable switch member connected with said shaft for rotation thereby, said switch means being connected in said circuit for operating same upon displacement of said one of said leaves by a workpiece discharged from said apparatus.

3. In a system for the automatic control of an apparatus producing a series of workpieces, the combination with an electric circuit adapted to be triggered upon the output of workpieces from said apparatus for controlling said apparatus, of:
 guide means at said apparatus forming a path for the workpieces discharged therefrom;
 sensing means along said guide path and responsive to the passage of a workpiece therealong, said sensing means including a housing comprising an elongated sleeve extending above said path transversely thereof, a shaft in the cavity of said sleeve journaled for rotation relative to said housing about a longitudinal axis of said shaft, said sleeve having a longitudinally extending slot communicating with said cavity, a plurality of longitudinally offset sensing leaves swingably depending from said shaft and passing through said slot into said path while being journaled in said housing for independent rotation on said shaft, each of said leaves having a respective bearing disk extending transversely to said axis and rotatably mounting said leaves in said cavity, and abutment means on said shaft and on said leaves for rotatably entraining said element along with one of said leaves deflected in one rotational sense by a workpiece traversing said path while permitting said leaves to swing freely relatively to said shaft in the opposite rotational sense;
 sensitive switch means having a swingable switching member operatively connected with said shaft for actuation thereby upon rotation of said shaft, said switch means being connected in said circuit for operating same upon displacement of said one of said leaves by a workpiece discharged from said apparatus, said sensitive-switch means having a spring counteracting its displacement by said shaft; and
 restoring means constituted solely by said spring for returning said shaft to a normal position upon displacement by said one of said leaves of said shaft into an off-normal position.

4. In a system for the automatic control of an apparatus producing a series of workpieces, the combination with an electric circuit adapted to be triggered upon the output of workpieces from said apparatus for controlling said apparatus, of:
 guide means at said apparatus forming a path for the workpieces discharged therefrom;
 sensing means along said guide path and responsive to the passage of a workpiece therealong, said sensing means including an elongated element extending above said path transversely thereof and journaled for rotation about a longitudinal axis of said element, a plurality of longitudinally offset sensing leaves depending from said element into said path and journaled on said element for independent rotation thereon, and abutment means on said element and on said leaves for entraining said element along with one of said leaves deflected in one rotational sense by a workpiece traverseing said path while permitting said leaves to swing freely relative to said element in the opposite rotational sense;
 switch means operatively connected with and actuatable by said element and connected in said circuit for operating same upon displacement of said one of said leaves by a workpiece discharged from said apparatus; and mechanism including magnetic means for adjustably securing said sensing means to said guide means.

5. In a system for the automatic control of an apparatus producing a series of workpieces, the combination with an electric circuit adapted to be triggered upon the output of workpieces from said apparatus for controlling said apparatus, of:

guide means at said apparatus forming a path for the workpieces discharged therefrom;

sensing means along said guide path and responsive to the passage of a workpiece therealong, said sensing means including an elongated element extending above said path transversely thereof and journaled for rotation about a longitudinal axis of said element, a plurality of longitudinally offset sensing leaves depending from said element into said path and journaled on said element for independent rotation thereon, and abutment means on said element and on said leaves for entraining said element along with one of said leaves deflected in one rotational sense by a workpiece traversing said path while permitting said leaves to swing freely relatively to said element in the opposite rotational sense;

sensitive switch means operatively connected with and actuatable by said element connected in said circuit for operating same upon displacement of said one of said leaves by a workpiece discharged from said apparatus, said sensitive switch means having a spring counteracting its displacement by said element;

restoring means including said spring for returning said element to a normal position upon displacement by said one of said leaves of said element into an off-normal position; and mechanism including magnetic means for adjustably securing said sensing means to said guide means.

6. In a system for the automatic control of an apparatus producing a series of workpieces, the combination with an electric circuit adapted to be triggered upon the output of workpieces from said apparatus for controlling said apparatus, of:

guide means at said apparatus forming a path for the workpieces discharged therefrom;

sensing means along said guide path and responsive to the passage of a workpiece therealong, said sensing means including a housing comprising an elongated sleeve extending above said path transversely thereof, an elongated element in the cavity of said sleeve journaled for rotation relative to said housing about a longitudinal axis of said element, said sleeve having a longitudinally extending slot communicating with said cavity, a plurality of longitudinally offset sensing leaves depending from said element through said slot into said path and journaled in said housing for independent rotation thereon, each of said leaves having a respective bearing disk extending transversely to said axis and rotatably mounting said leaves in said cavity, and abutment means on said element and on said leaves for entraining said element along with one of said leaves deflected in one rotational sense by a workpiece traversing said path while permitting said leaves to swing freely relatively to said element in the opposite rotational sense;

sensitive switch means operatively connected with and actuatable by said element and connected in said circuit for operating same upon displacement of said one of said leaves by a workpiece discharged from said apparatus, said sensitive switch means having a spring counteracting its displacement by said element;

restoring means constituted solely by said spring for returning said element to a normal position upon displacement by said one of said leaves of said element into an off-normal position; and mechanism including magnetic means for adjustably securing said sensing means to said guide means.

7. In a system for the automatic control of an apparatus producing a series of workpieces, the combination with an electric circuit adapted to be triggered upon the output of workpieces from said apparatus for controlling said apparatus, of:

guide means at said apparatus forming a path for the workpieces discharged therefrom;

sensing means along said guide path and responsive to the passage of a workpiece therealong, said sensing means including a housing formed with an elongated cavity extending above said path transversely thereof, an elongated element in said cavity journaled for rotation relative to said housing about a longitudinal axis of said element, a plurality of longitudinally offset sensing leaves depending from said element into said path and journaled in said housing for independent rotation thereon, each of said leaves having a respective bearing disk extending transversely to said axis and rotatably mounting said leave in said cavity, and abutment means on said element and on said leaves for entraining said element along with one of said leaves deflected in one rotational sense by a workpiece traversing said path while permitting said leaves to swing freely relatively to said element in the opposite rotational sense;

sensitive switch means operatively connected with and actuatable by said element and connected in said circuit for operating same upon displacement of said one of said leaves by a workpiece discharged from said apparatus, said sensitive switch means having a spring counteracting its displacement by said element;

restoring means constituted solely by said spring for returning said element to a normal position upon displacement by said one of said leaves of said element into an off-normal position;

mechanism including magnetic means for adjustably securing said sensing means to said guide means; and gooseneck-tube means bridging said housing and said magnetic means for adjustably positioning said sensing means above said path.

8. In a system for the automatic control of an apparatus producing a series of workpieces, the combination with an electric circuit adapted to be triggered upon the output of workpieces from said apparatus for controlling said apparatus, of:

guide means at said apparatus forming a path for the workpieces discharged therefrom;

sensing means along said guide path and responsive to the passage of a workpiece therealong, said sensing means including a housing formed with an elongated cavity extending above said path transversely thereof, an elongated element in said cavity journaled for rotation relative to said housing about a longitudinal axis of said element, a plurality of longitudinally offset sensing leaves depending from said element into said path and journaled in said housing for independent rotation thereon, each of said leaves having a respective bearing disk extending transversely to said axis and rotatably mounting said leave in said cavity, and abutment means on said element and on said leaves for entraining said element along with one of said leaves deflected by a workpiece traversing said path while permitting said leaves to swing freely relatively to said element in the opposite rotational sense;

switch means operatively connected with and actuatable by said element and connected in said circuit for operating same upon displacement of said one of said leaves by a workpiece discharged from said apparatus; and baffle means on said housing for deflecting workpieces discharged by said apparatus to said guide path.

9. In a system for the automatic control of an apparatus producing a series of workpieces, the combination with an electric circuit adapted to be triggered upon the output of workpieces from said apparatus for controlling said apparatus, of:

guide means at said apparatus forming a path for the workpieces discharged therefrom;

sensing means along said guide path and responsive to the passage of a workpiece therealong, said sensing means including a housing formed with an elongated cavity extending above said path transversely thereof, an elongated element in said cavity journaled for rotation relative to said housing about a longitudinal axis of said element, a plurality of longitudinally offset sensing leaves depending from said element into said path and journaled in said housing for independent rotation thereon, each of said leaves having a respective bearing disk extending transversely to said axis and rotatably mounting said leaves in said cavity, and abutment means on said element and on said leaves for entraining said element along with one of said leaves deflected in one rotational sense by a workpiece traversing said path while permitting said leaves to swing freely relatively to said element in the opposite rotational sense;

sensitive switch means operatively connected with and actuatable by said element and connected in said circuit for operating same upon displacement of said one of said leaves by a workpiece discharged from said apparatus, said sensitive switch means having a spring counteracting its displacement by said element;

restoring means constituted solely by said spring for returning said element to a normal position upon displacement;

mechanism including magnetic means for adjustably securing said sensing means to said guide means; and baffle means on said housing for deflecting workpieces discharged by said apparatus to said guide path.

10. In a system for the automatic control of an apparatus producing a series of workpieces, the combination with an electric circuit adapted to be triggered upon the output of workpieces from said apparatus for controlling said apparatus, of:

guide means at said apparatus forming a path for the workpieces discharged therefrom;

sensing means along said guide path and responsive to the passage of a workpiece therealong, said sensing means including a housing comprising an elongated sleeve extending above said path transversely thereof, an elongated element in the cavity of said sleeve journaled for rotation relative to said housing about a longitudinal axis of said element, said sleeve having a longitudinally extending slot communicating with said cavity, a plurality of longitudinally offset sensing leaves depending from said element through said slot into said path and journaled in said housing for independent rotation thereon, each of said leaves having a respective bearing disk extending transversely to said axis and rotatably mounting said leaves in said cavity, and abutment means on said element and on said leaves for entraining said element along with one of said leaves deflected in one rotational sense by a workpiece traversing said path while permitting said leaves to swing freely relatively to said element in the opposite rotational sense;

sensitive switch means operatively connected with and actuatable by said element and connected in said circuit for operating same upon displacement of said one of said leaves by a workpiece discharged from said apparatus, said sensitive switch means having a spring counteracting its displacement by said element;

restoring means constituted solely by said spring for returning said element to a normal position upon displacement by said one of said leaves of said element into an off-normal position;

mechanism including magnetic means for adjustably securing said sensing means to said guide means, and gooseneck-tube means bridging said housing and said magnetic means for adjustably positioning said sensing means above said path; and baffle means on said housing for deflecting workpieces discharged by said apparatus to said guide path.

References Cited by the Examiner

UNITED STATES PATENTS

| 3,023,283 | 2/1962 | Wintriss | 200—61.41 |
| 3,067,412 | 12/1962 | Dixon | 200—61.41 X |
| 3,179,764 | 4/1965 | Wintriss | 200—61.41 |
| 3,207,870 | 9/1965 | Herrea et al. | 200—61.41 |

BERNARD A. GILHEANY, *Primary Examiner.*

J. J. BAKER, *Assistant Examiner.*

UNITED STATES PATENT OFFICE
CERTIFICATE OF CORRECTION

Patent No. 3,315,048                                        April 18, 1967

Werner Brummund

It is hereby certified that error appears in the above numbered patent requiring correction and that the said Letters Patent should read as corrected below.

In the heading to the printed specification, lines 4 and 5, for "assignor to Friedrich Stüble" read -- assignor to Friedrich Stübbe --.

Signed and sealed this 14th day of Novmeber 1967.

(SEAL)
Attest:

Edward M. Fletcher, Jr.

Attesting Officer

EDWARD J. BRENNER

Commissioner of Patents